United States Patent
Han

(10) Patent No.: US 12,452,027 B2
(45) Date of Patent: Oct. 21, 2025

(54) CHANNEL INFORMATION PROCESSING METHOD AND APPARATUS, DEVICE, AND STORAGE MEDIUM

(71) Applicant: ZTE CORPORATION, Guangdong (CN)

(72) Inventor: Huben Han, Shenzhen (CN)

(73) Assignee: SANECHIPS TECHNOLOGY CO., LTD., Shenzhen (CN)

( * ) Notice: Subject to any disclaimer, the term of this patent is extended or adjusted under 35 U.S.C. 154(b) by 508 days.

(21) Appl. No.: 18/020,306

(22) PCT Filed: Jul. 21, 2021

(86) PCT No.: PCT/CN2021/107716
§ 371 (c)(1),
(2) Date: Feb. 8, 2023

(87) PCT Pub. No.: WO2022/033285
PCT Pub. Date: Feb. 17, 2022

(65) Prior Publication Data
US 2023/0336319 A1    Oct. 19, 2023

(30) Foreign Application Priority Data
Aug. 12, 2020 (CN) .......... 202010808390.0

(51) Int. Cl.
*H04L 5/00* (2006.01)
*H04L 1/00* (2006.01)
(52) U.S. Cl.
CPC .......... *H04L 5/0098* (2013.01); *H04L 5/0053* (2013.01)
(58) Field of Classification Search
CPC .... H04L 5/0098; H04L 5/0053; H04L 5/0091
See application file for complete search history.

(56) References Cited

U.S. PATENT DOCUMENTS

2009/0285323 A1*  11/2009  Sundberg .............. H04L 1/0631
                                                                   375/267
2012/0207126 A1*  8/2012   Qu ........................ H04L 5/0053
                                                                   370/329

(Continued)

FOREIGN PATENT DOCUMENTS

CN        104081710 A    10/2014
CN        104734809 A    6/2015

(Continued)

OTHER PUBLICATIONS

3GPP TSG RAN WG1 Meeting#71, R1-124763 Title: Resource configuration and serach space design for E-PDCCH (Year: 2012).*

(Continued)

*Primary Examiner* — Faruk Hamza
*Assistant Examiner* — Abusayeed M Haque
(74) *Attorney, Agent, or Firm* — CANTOR COLBURN LLP

(57) ABSTRACT

A channel information processing method includes: generating a de-mapping related parameter of each CORESET and a first start parameter of each search space; generating a second start parameter of each CORESET; traversing each second start occasion, calculating index information of blind detection parameter and de-mapping related parameter, and storing the index information of the blind detection parameter and the de-mapping related parameter into a search space associated with the traversed second start occasion; traversing each search space, if a traversed search space is activated, updating a state of an activation flag in the second start occasion to an activated state; and sequentially traversing each second start occasion according to a time sequence, and in a case where the state of the activation flag in the traversed second start occasion is the activated state, reading (Continued)

the de-mapping related parameter and the blind detection parameter corresponding to the second start occasion.

20 Claims, 6 Drawing Sheets

(56) References Cited

U.S. PATENT DOCUMENTS

| | | | | |
|---|---|---|---|---|
| 2017/0280441 | A1* | 9/2017 | Shimezawa | H04W 72/04 |
| 2019/0158205 | A1 | 5/2019 | Sheng et al. | |
| 2019/0313321 | A1 | 10/2019 | Xu | |
| 2020/0015258 | A1 | 1/2020 | Zhou | |
| 2020/0250536 | A1 | 8/2020 | Lim et al. | |
| 2021/0212031 | A1* | 7/2021 | Li | H04W 72/23 |
| 2021/0259005 | A1* | 8/2021 | Yoshioka | H04L 27/2602 |
| 2023/0069690 | A1* | 3/2023 | Takahashi | H04L 1/08 |

FOREIGN PATENT DOCUMENTS

| | | |
|---|---|---|
| CN | 110535596 A | 11/2018 |
| CN | 109429186 A | 3/2019 |
| CN | 109673056 A | 4/2019 |
| CN | 111435878 A | 7/2020 |
| EP | 3487110 A1 | 5/2019 |
| WO | 2019099738 A1 | 5/2019 |
| WO | 2020056068 A1 | 3/2020 |

OTHER PUBLICATIONS

Japanese Office Action for corresponding application Japanese Patent Application No. 2023-508597; Dated Feb. 17, 2025.
European Search Report for corresponding application EP21855338; Report dated Dec. 21, 2023.
Intel Corporation, "NR-PDCCH structure and transmission", 3GPP TSG-RAN WG1 #89 Hangzhou, P. R. China, May 15-19, 2017, R1-1707375.
Intel Corporation, "Remaining details of NR-PDCCH structure", 3GPP TSG-RAN WG1 91 Reno, USA, Nov. 27-Dec. 1, 2017, R1-1720081.
International Search Report for corresponding application PCT/CN2021/107716 filed Jul. 21, 2021; Mail date Oct. 26, 2021.

* cited by examiner

Fig. 2

Start parameters of search spaces

| SS0 C0 | | | |
| SS1 C1 | SS1 C1 | SS1 C1 | SS1 C1 |
| SS2 C0 | SS2 C0 | | |
| SS3 C2 | | | |

| | | | | |
|---|---|---|---|---|
| C0 | SS0 | SS2 | SS2 | |
| C1 | SS1 | SS1 | SS1 | SS1 |
| C2 | SS3 | | | |

Start parameters of CORESETs

CHANNEL INFORMATION PROCESSING METHOD AND APPARATUS, DEVICE, AND STORAGE MEDIUM

CROSS REFERENCE

This application is a National Stage Filing of the PCT International Application No. PCT/CN2021/107716 filed on Jul. 21, 2021, which claims priority to Chinese Patent Application No. 202010808390.0 filed on Aug. 12, 2020, the entirety of which is herein incorporated by reference.

TECHNICAL FIELD

The present disclosure relates to the technical field of 5th-Generation (5G) physical-layer channels, and particularly to a channel information processing method and apparatus, a device, and a storage medium.

BACKGROUND

A Physical Downlink Control Channel (PDCCH) is used for bearing scheduling and other control information, and de-mapping and blind detection are two important information processing processes. A PDCCH in 5th Generation New Radio (5G NR) is more complicated than that in 4th-Generation (4G) Long Term Evolution (LTE), since in 5G NR the PDCCH is configured in a more diversified and flexible manner in the time domain, and maximally supports 100M in the frequency domain. Therefore, parameters used for performing the de-mapping, blind detection, etc., of the PDCCH in 5G NR are several times those needed in 4G LTE, which brings a significant increase in the amount of calculation.

In a 5G scenario, the amount of calculation is increased, but the time for calculation is reduced. Therefore, it is quite important to ensure the correct reception of a PDCCH in a Transmission Time Interval (TTI).

SUMMARY

Embodiments of the present disclosure provide a channel information processing method and apparatus, a device, and a storage medium, which can greatly reduce the amount of data calculation for processing information in a PDCCH, thereby improving the information processing efficiency.

An embodiment of the present disclosure provides a channel information processing method, which includes the following operations.

A de-mapping related parameter of each Control Resource Set (CORESET) and a first start parameter of each search space are generated, wherein the first start parameter includes a CORESET associated with the search space.

A second start parameter of each CORESET is generated according to the first start parameter, wherein the second start parameter includes one or more second start occasions and one or more search spaces associated with the one or more second start occasions.

Each second start occasion is traversed according to the second start parameter, index information of a blind detection parameter and the de-mapping related parameter is calculated, and the index information of the blind detection parameter and the de-mapping related parameter is stored into the search space associated with the traversed second start occasion.

Each search space is traversed, whether the traversed search space is activated is determined, and in a case where the traversed search space is activated, a state of an activation flag in the second start occasion, associated with the search space, of the CORESET is updated to an activated state.

Each second start occasion in the second start parameter of each CORESET is sequentially traversed according to a time sequence, and in a case where the state of the activation flag in the traversed second start occasion is the activated state, the de-mapping related parameter and the blind detection parameter corresponding to the second start occasion are read.

An embodiment of the present disclosure provides a channel information processing apparatus, which includes a de-mapping related parameter generation module, a second start parameter generation module, a blind detection parameter calculation module, an activation flag updating module, and a parameter reading module.

The de-mapping related parameter generation module is configured to generate a de-mapping related parameter of each CORESET and a first start parameter of each search space, wherein the first start parameter includes a CORE-SET associated with the search space.

The second start parameter generation module is configured to generate a second start parameter of each CORESET according to the first start parameter, wherein the second start parameter includes one or more second start occasions and one or more search spaces associated with the one or more second start occasions.

The blind detection parameter calculation module is configured to traverse each second start occasion according to the second start parameter, calculate index information of a blind detection parameter and the de-mapping related parameter, and store the index information of the blind detection parameter and the de-mapping related parameter into the search space associated with the traversed second start occasion.

The activation flag updating module is configured to traverse each search space, determine whether the traversed search space is activated, and in a case where the traversed search space is activated, update a state of an activation flag in the second start occasion, associated with the search space, of the CORESET to an activated state.

The parameter reading module is configured to sequentially traverse each second start occasion in the second start parameter of each CORESET according to a time sequence, and in a case where the state of the activation flag in the traversed second start occasion is the activated state, read the de-mapping related parameter and the blind detection parameter corresponding to the second start occasion.

An embodiment of the present disclosure provides a computer device, which includes a memory, a processor, and a computer program stored in the memory and capable of running in the processor. The processor executes the program to implement the channel information processing method as described in the embodiments of the present disclosure.

An embodiment of the present disclosure provides a computer-readable storage medium, which stores a computer program. The program is executed by a processor to implement the channel information processing method as described in the embodiments of the present disclosure.

Through the embodiments of the present disclosure, a de-mapping related parameter of each CORESET and a first start parameter of each search space are generated; a second start parameter of each CORESET is generated according to the first start parameter, wherein the second start parameter includes one or more second start occasions and one or more search spaces associated with the one or more second start occasions; each second start occasion is traversed according to the second start parameter, index information of a blind detection parameter and the de-mapping related parameter is calculated, and the index information of the blind detection parameter and the de-mapping related parameter is stored into a search space associated with the traversed second start occasion; each search space is traversed, whether the traversed search space is activated is determined, and in a case where the traversed search space is activated, a state of an activation flag in the second start occasion, associated with the search space, of the CORESET is updated to an activated state; and each second start occasion in the second start parameter of each CORESET is sequentially traversed according to a time sequence, and in a case where the state of the activation flag in the traversed second start occasion is the activated state, the de-mapping related parameter and the blind detection parameter corresponding to the second start occasion are read. According to the channel information processing method provided in the embodiments of the present disclosure, a de-mapping related parameter and a blind detection parameter are pre-calculated during semi-static processing, and during dynamic processing, in a case where a CORESET is activated, the pre-calculated de-mapping related parameter and blind detection parameter are read directly. Therefore, the amount of data calculation for information processing in a PDCCH is reduced greatly, and furthermore, the information processing efficiency is improved.

BRIEF DESCRIPTION OF THE DRAWINGS

FIG. 2 is an exemplary diagram of start parameters of search spaces according to an embodiment of the present disclosure;

DETAILED DESCRIPTION

Figure 1:
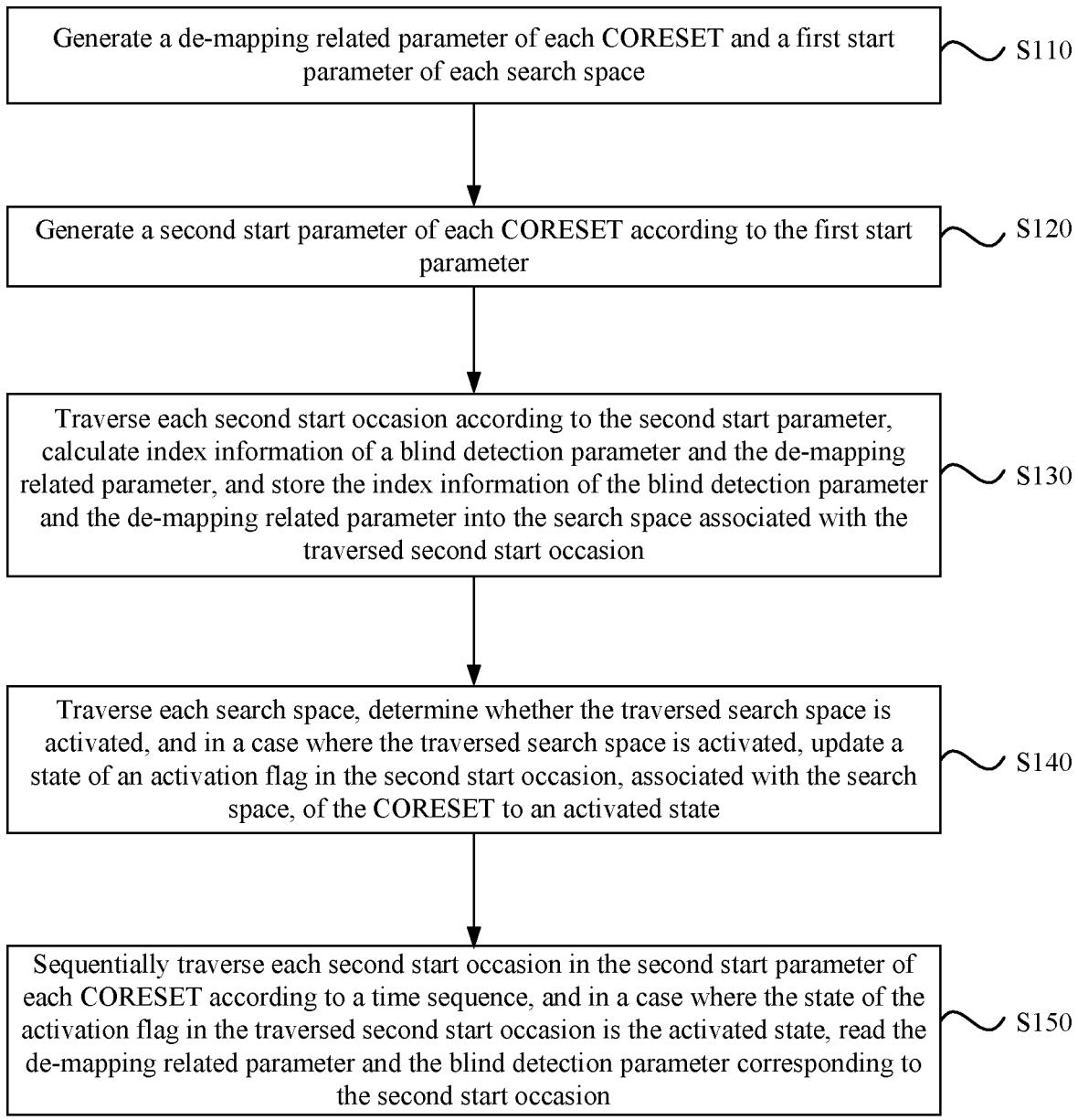
FIG. 1 is a flowchart of a channel information processing method according to an embodiment of the present disclosure.

In order to make the objective, technical solutions, and advantages of the present disclosure clearer, the embodiments of the present disclosure will be described below in detail in combination with the drawings. It is to be noted that the embodiments in the present disclosure and characteristics in the embodiments may be combined freely without conflicts.

It is to be understood that the exemplary embodiments described herein are only for explaining the present disclosure rather than limiting the present disclosure.

In the subsequent descriptions, suffixes for representing components, such as "module", "part", or "unit", are only for facilitating the description of the present disclosure, and do not have any particular meanings. Therefore, "module", "part", or "unit" may be used in combination.

In 5G, when a sub-carrier spacing is 120 kHz, each TTI is only 0.125 milliseconds. In LTE, a TTI is fixed to be 1 millisecond. Therefore, in a 5G scenario where the amount of calculation is increased but the time for calculation is reduced, how to ensure the correct reception of a PDCCH in one TTI is quite important.

In NR, a cell has at most four Band Width Parts (BWPs), each of which supports at most three CORESETs (increased to five in Release 16 (R16)). Each BWP supports at most 10 search spaces, each of which is bound with one CORESET. If different search spaces bound with the same CORESET are at different time-domain positions, or correspond to different blind detection parameters, de-mapping and blind detection parameters may be different. Therefore, assuming at most seven start occasions (corresponding to different time-domain positions of the search space) for each CORESET, five CORESETs need at most 35 sets of de-mapping and blind detection parameters. In addition, the same start occasion may correspond to multiple search spaces, and blind detection parameters of the search spaces are different, so the parameters are needed to be calculated independently for each search space.

A blind detection candidate set in NR is more flexible. CCE positions corresponding to one coverage level are discontinuous, and different scrambling modes and loads at the same CCE position are regarded as different candidate sets. Therefore, more parameters are needed, and the amount of calculation is larger.

In a related art, de-mapping related parameters and blind detection parameters are calculated dynamically. That is, all related operations or most of related operations are completed in each TTI. In 5G NR, the amount of calculation is increased greatly, so completing the calculation in one TTI has high requirements on a main frequency and an implementation algorithm.

PDCCH-based configuration parameters are all semi-static, and needed parameters are possible to be pre-calculated. Therefore, if a complicated calculation is divided into two parts, i.e., semi-static processing and dynamic processing, and if calculation of semi-static parameters, even including calculations of dynamic parameters of some finite sets, can be completed in advance during semi-static processing, the time pressure of dynamic processing in one TTI may be reduced.

A criterion of semi-static processing is to try to complete calculations of various parameters needed by dynamic calculation in advance, and thus provide a database for subsequent dynamic calculation. The database should not be too large, so as to avoid a huge space consumption. Meanwhile, data needs to be put in order, so that needed parameters may be retrieved rapidly during dynamic calculation.

A criterion of dynamic processing is to try to reduce calculation, retrieve needed information rapidly from the database by use of a dynamic and semi-static link relationship, and make a configuration according to a rule required by hardware.

A PDCCH includes two parts, i.e., a search space and a CORESET. De-mapping resources are mainly for CORESETs, and blind detection resources are mainly for search spaces. The two dimensions of CORESET and search space are involved in both semi-static processing and dynamic processing. Sub-processes in both semi-static processing and dynamic processing are all based on the two dimensions.

Data in the dimension of CORESET includes a mapping relationship from a Resource Element Group Buddle (REGB) to a Physical Resource Block (PRB), a mapping relationship from a Control Channel Element (CCE) to an REGB, and a first start parameter.

Both the mapping relationship from the REGB to the PRB and the mapping relationship from the CCE to the REGB are represented in a bitmap form. The first start parameter includes the number of start occasion(s) of a CORESET in one slot, a starting symbol of each start occasion, a serial number of an associated search space, an activation flag about whether to activate in the present slot, etc.

Data in the dimension of search space includes index information of a bitmap from an REGB to a PRB, an index relationship of a bitmap from a CCE to an REGB, and a second start parameter.

The second start parameter includes the number of start occasion(s) of a search space in one slot, a starting symbol of each start occasion, and positions of the start occasion(s) in the start parameter of the CORESET.

In an embodiment, FIG. 1 is a flowchart of a channel information processing method according to an embodiment of the present disclosure. The method is applicable to the processing of information in a PDCCH. The method may be executed by a channel information processing apparatus. As shown in FIG. 1, the method includes operations S110 to S150.

In S110, a de-mapping related parameter of each CORESET and a first start parameter of each search space are generated.

The first start parameter includes a CORESET associated with the search space, represented by an Identity (ID) of the CORESET. The de-mapping related parameter includes a de-mapping configuration parameter, a mapping relationship from an REGB to a PRB, and a mapping relationship from a CCE to an REGB. The mapping relationship from the CCE to the REGB involves a de-interleaving operation, which is a part involving a relatively large amount of calculation. In the embodiment, both the mapping relationship from the REGB to the PRB and the mapping relationship from the CCE to the REGB may be represented in a bitmap form.

In an embodiment, the operation of generating the de-mapping related parameter of each CORESET may be implemented as follows. Configuration information may be processed by use of an algorithm specified in a 5G communication protocol, so as to obtain the de-mapping related parameter.

The first start parameter further includes the number of one or more first start occasions and a starting symbol of each first start occasion. The CORESET associated with the search space includes a CORESET respectively associated with each of the one or more first start occasions.

In an embodiment, the first start parameter of each search space may be generated in the following manner: for each search space, each first start occasion is sequenced according to the starting symbol of each first start occasion to obtain the first start parameter of each search space. The sequencing may be performed in a descending order or in an ascending order.

Exemplarily, FIG. 2 is an exemplary diagram of start parameters of search spaces according to an embodiment of the present disclosure. As shown in FIG. 2, SS represents search space, and C represents CORESET. There are totally four SSs, i.e., SS0 to SS3, and three Cs, i.e., C0 to C2. The search space SS0 has one start occasion with a starting symbol 0 and associated with the CORESET C0. The search space SS1 has four start occasions with starting symbols 0, 3, 6, and 9 respectively, and all the start occasions of the search space SS1 are associated with the CORESET C1. The search space SS2 has two start occasions with starting symbols 1 and 3 respectively, and both start occasions of the search space SS2 are associated with the CORESET C0. The search space SS3 has one start occasion with a starting symbol 2 and associated with the CORESET C2.

In S120, a second start parameter of each CORESET is generated according to the first start parameter.

The second start parameter includes one or more second start occasions and one or more search spaces associated with the one or more second start occasions.

In an embodiment, the second start parameter of each CORESET may be generated according to the first start parameter in the following manner: first start occasions in respective search spaces are sequenced according to the starting symbol and/or a continuous symbol length of each first start occasion, and first start occasions with the same starting symbol and associated with the same CORESET are merged to obtain the one or more second start occasions of each CORESET; and the search space associated with each second start occasion is determined according to the first start occasions in respective search spaces to obtain the second start parameter of each CORESET.

Figures 3, 4:
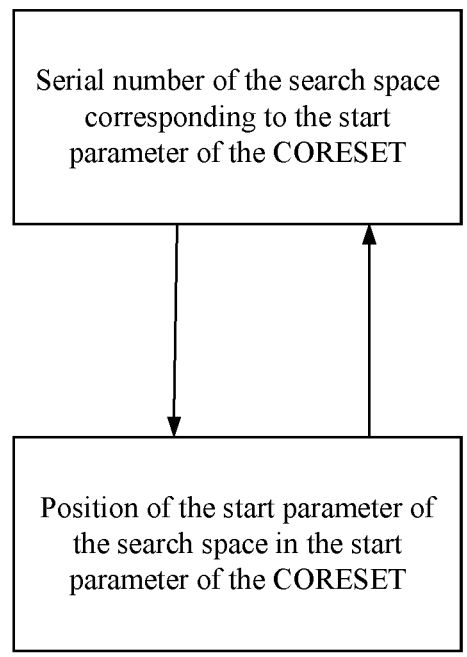
FIG. 3 is an exemplary diagram of start parameters of CORESETs according to an embodiment of the present disclosure.
FIG. 4 is an exemplary diagram of a link relationship between a CORESET and a search space according to an embodiment of the present disclosure.

In an exemplary implementation, first start occasions in respective search spaces are sequenced according to the starting symbol of each first start occasion, so all the start occasions associated with the same CORESET need to be sequenced integrally. For example, both SS0 and SS2 are associated with C0, so the first start occasion of SS0 and the two first start occasions of SS2 are sequenced integrally. The sequencing is implemented in the following manner: the first start occasions are sequenced primarily according to the starting symbols, the first start occasions with the same starting symbols are sequenced further according to the continuous symbol lengths, and the first start occasions with the same starting symbol and associated with the same CORESET are finally merging, so as to obtain the one or more second start occasions of each CORESET. Exemplarily, FIG. 3 is an exemplary diagram of start parameters of CORESETs according to an embodiment of the present disclosure. As shown in FIG. 3, four SSs are sequenced according to the CORESETs C that they belong to, as well as starting symbols. The 1st start occasion of C0 corresponds to the 1st start occasion of SS0, the 2nd start occasion of C0 corresponds to the 1st start occasion of SS2, and the 3rd start occasion of C0 corresponds to the 2nd start occasion of SS2. The start occasions of C1 and C2 are obtained in a similar manner.

In an exemplary implementation, a position of each first start occasion in the CORESET is determined according to the search space associated with each second start occasion, and the position of each first start occasion in the CORESET is added to the first start parameter. As such, a link relationship between the CORESET and the search space is established. FIG. 4 is an exemplary diagram of a link relationship between a CORESET and a search space according to an embodiment of the present disclosure. As shown in FIG. 4, in the start parameter of a search space, a position of the start parameter in the start parameter of a CORESET is recorded, and an SS index corresponding to each start is also recorded in the start parameter of the CORESET. Therefore, the corresponding SS parameter is retrieved according to the start parameter of the CORESET, and a start position of the CORESET corresponding to an SS is enabled in the processing of the SS.

In S130, each second start occasion is traversed according to the second start parameter, index information of a blind detection parameter and the de-mapping related parameter is calculated, and the index information of the blind detection parameter and the de-mapping related parameter is stored into the search space associated with the traversed second start occasion.

Figure 5:
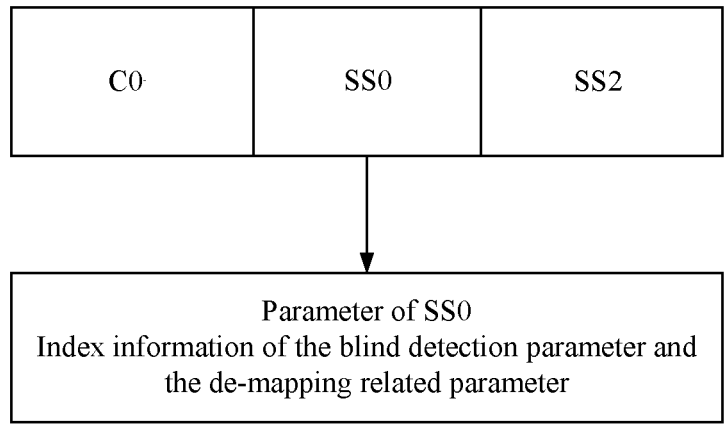
FIG. 5 is an exemplary diagram of calculating index information of a blind detection parameter and a de-mapping related parameter according to an embodiment of the present disclosure.

The blind detection parameter includes a CCE start position, a scrambling mode, a load, and an aggregation level. In the embodiment, PDCCH de-mapping and blind detection in each TTI are implemented taking CORESET start as a unit, so semi-static processing is also performed in this manner. That is, each second start occasion of each CORESET is traversed, and the blind detection parameter and the de-mapping related parameter are calculated. In this operation, calculation is implemented sequentially according to CORESET starts, but the calculated parameters are stored taking search space as a unit. Therefore, a position of the corresponding search space needs to be retrieved according to the associated search space in the second start parameter of the CORESET. FIG. 5 is an exemplary diagram of calculating index information of a blind detection parameter and a de-mapping related parameter according to an embodiment of the present disclosure. As shown in FIG. 5, taking the 1st start occasion of C0 as an example, the search space SS0 is retrieved according to an associated search space in a second start parameter of the CORESET.

In the embodiment, the CCE start position is of some importance. This is because bitmap information of de-mapping and blind detection, such as a Resource Element Group (REG) resource bitmap and a mapping bitmap from CCEs to REGs, needs to be determined according to positions of CCEs. The CCE start position is related to a slot number, all possible slot positions need to be considered during semi-static calculation, and at most 80 sets of parameters are needed in the embodiment. Due to a relatively large number of sets, it is necessary to reduce a capacity of each set of parameters as much as possible. That is, only the parameters related to different slots are maintained, and only one copy of parameters is maintained for invariable parameters.

In the embodiment, S110 and S130 are all semi-static processing, and calculation is performed only during parameter configuration and re-configuration. During parameter configuration and re-configuration, a time requirement is not so strict, and therefore processing involving a relatively large amount of calculation is allowed, thereby finally obtaining de-mapping and blind detection parameters corresponding to each start of each CORESET. A start of each CORESET certainly corresponds to a start of an SS, so the de-mapping related parameter and the blind detection parameter are distributed in the two entities. Moreover, a link relationship between the CORESET and the search space is established according to the start parameters of the search space and the CORESET.

In S140, each search space is traversed, whether the traversed search space is activated is determined, and in a case where the traversed search space is activated, a state of an activation flag in the second start occasion, associated with the search space, of the CORESET is updated to an activated state.

Whether the present search space is activated may be determined according to information such as a time-domain pattern and a blind detection capability. Each search space may be sequentially traversed according to a set priority. Herein, the set priority satisfies a condition that a priority of a common search space is higher than that of a user search space.

Figure 6:
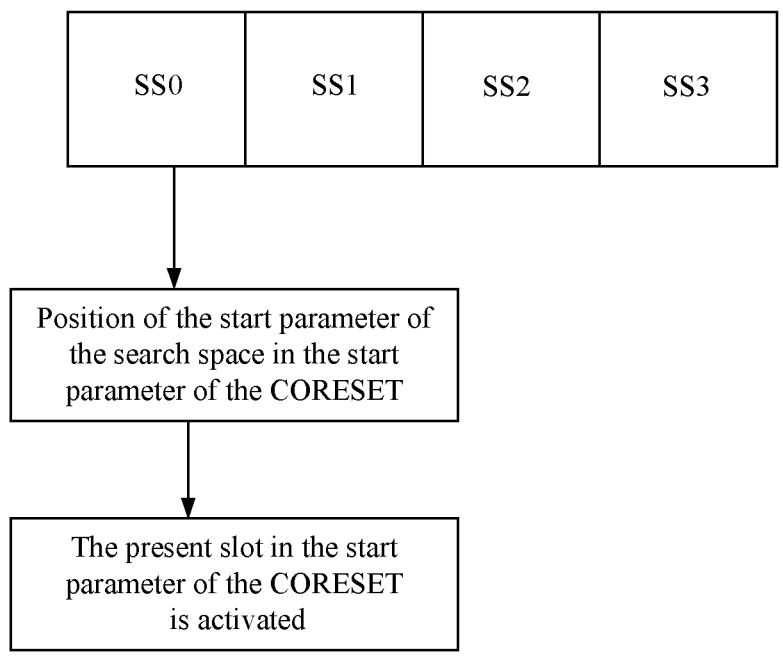
FIG. 6 is an exemplary diagram of adding an activation flag according to an embodiment of the present disclosure.

In an exemplary implementation, according to a present slot number, the search spaces are traversed to determine whether each search space is activated. The sequence of traversing the search spaces is determined in the following manner: traversing is performed according to priorities of the search spaces, for example, common search spaces are traversed first, and then user search spaces are traversed. For search spaces of the same type, the traversing is performed according to a configured sequence. If a search space is determined to be activated, a state of an activation flag of the search space in the start parameter of the CORESET is updated to an activated state. Exemplarily, FIG. 6 is an exemplary diagram of updating an activation flag according to an embodiment of the present disclosure. As shown in FIG. 6, SS0 is activated in a present slot, a position of SS0 in the start parameter of the CORESET is retrieved from the start parameter of the search space, and a state of an activation flag at this start position is updated to an activated state.

In S150, each second start occasion in the second start parameter of each CORESET is sequentially traversed according to a time sequence, and in a case where the state of the activation flag in the traversed second start occasion is the activated state, the de-mapping related parameter and the blind detection parameter corresponding to the second start occasion are read.

In an exemplary implementation, each start occasion in each CORESET is traversed according to a time sequence, and if the search space corresponding to this start occasion is determined to be activated, the de-mapping and blind detection parameters pre-calculated for the search space are read.

Figure 7:
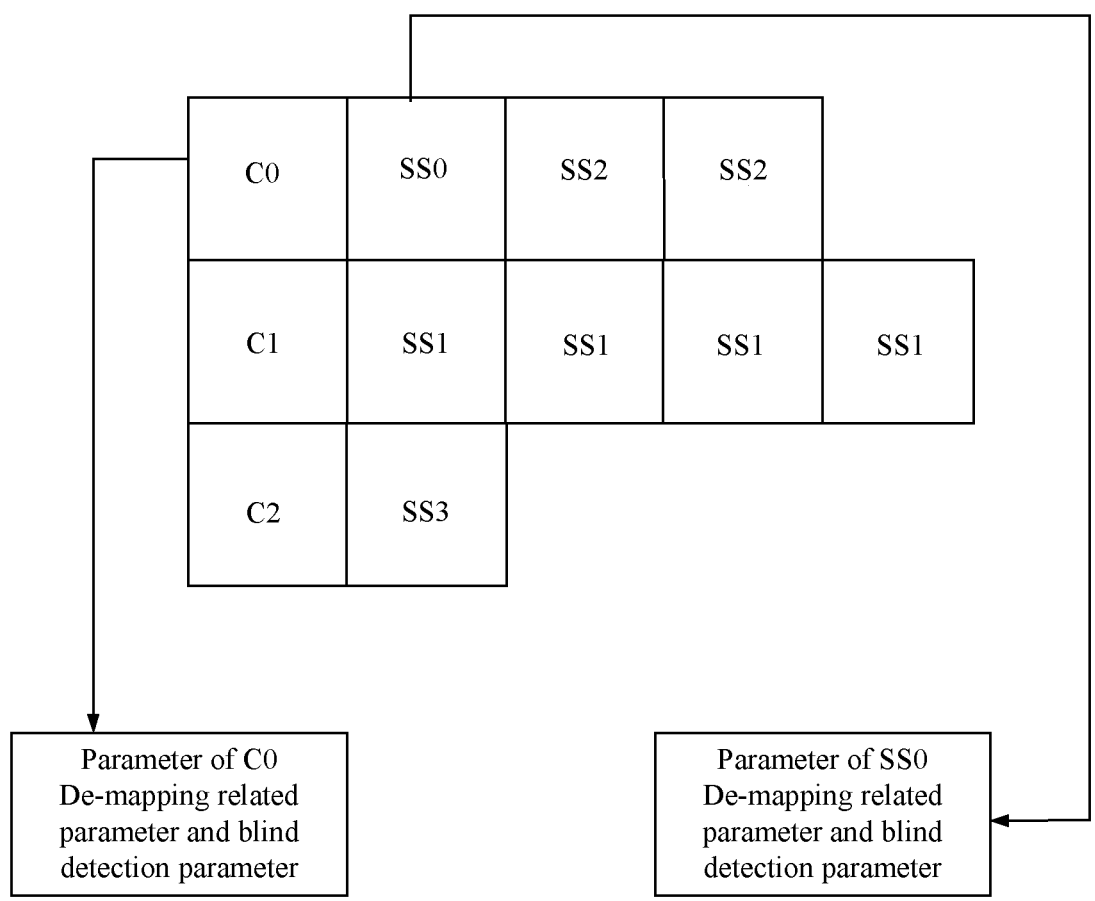
FIG. 7 is an exemplary diagram of reading a de-mapping related parameter and a blind detection parameter according to an embodiment of the present disclosure.

FIG. 7 is an exemplary diagram of reading a de-mapping related parameter and a blind detection parameter according to an embodiment of the present disclosure. As shown in FIG. 7, when a 1st start occasion of C0 is traversed, a search space associated with this start occasion is SS0, and SS0 is determined to be activated. In such case, a de-mapping related parameter and a blind detection parameter are read directly.

S140 to S150 relate to a dynamic calculation part. Only the determination of whether the search space is activated and the acquisition of the pre-calculated parameters need to be performed in the two operations, so the workload is relatively low.

According to the technical solution in the embodiment of the present disclosure, a de-mapping related parameter of each CORESET and a first start parameter of each search space are generated; a second start parameter of each CORESET is generated according to the first start parameter, wherein the second start parameter includes one or more second start occasions and one or more search spaces associated with the one or more second start occasions; each second start occasion is traversed according to the second start parameter, index information of a blind detection parameter and the de-mapping related parameter is calculated, and the index information of the blind detection parameter and the de-mapping related parameter is stored into a search space associated with the traversed second start occasion; each search space is traversed, whether the traversed search space is activated is determined, and in a case where the traversed search space is activated, a state of an activation flag in the second start occasion, associated with the search space, of the CORESET is updated to an activated state; and each second start occasion in the second start parameter of each CORESET is sequentially traversed according to a time sequence, and in a case where the state of the activation flag in the traversed second start occasion is the activated state, the de-mapping related parameter and the blind detection parameter corresponding to the second start occasion are read. According to the channel information processing method provided in the embodiment of the present disclosure, a de-mapping related parameter and a blind detection parameter are pre-calculated during semi-static processing, and during dynamic processing, in a case where a CORESET is activated, the pre-calculated de-mapping related parameter and blind detection parameter are read directly. Therefore, the amount of data calculation for information processing in a PDCCH is reduced greatly, and furthermore, the information processing efficiency is improved.

Figure 8:
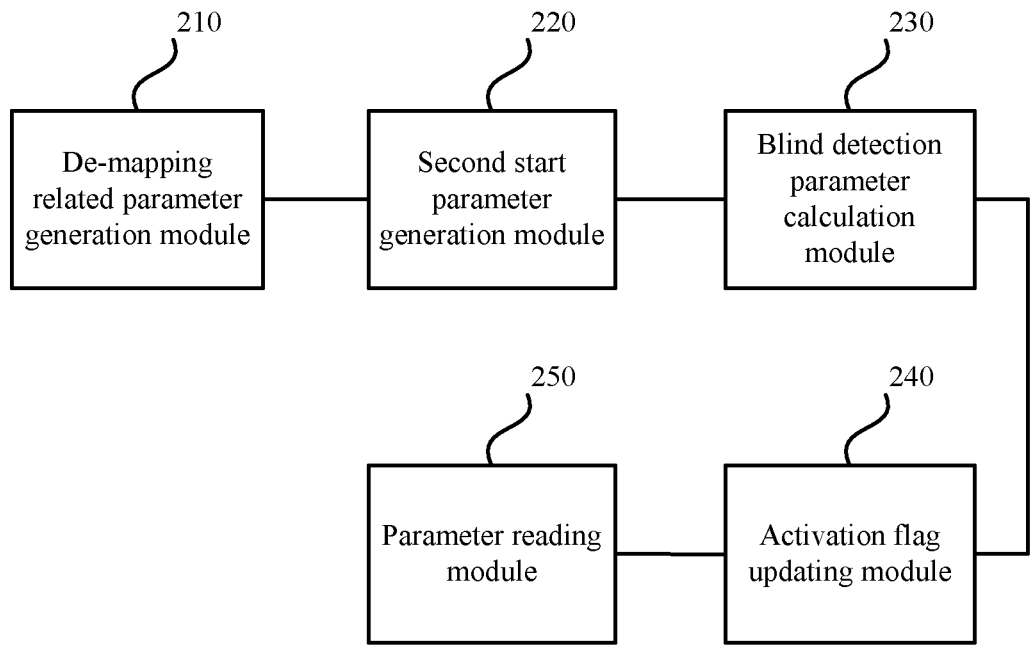
FIG. 8 is a structure diagram of a channel information processing apparatus according to an embodiment of the present disclosure.

In an embodiment, FIG. 8 is a structure diagram of a channel information processing apparatus according to an embodiment of the present disclosure. As shown in FIG. 8, the apparatus includes a de-mapping related parameter generation module 210, a second start parameter generation module 220, a blind detection parameter calculation module 230, an activation flag updating module 240, and a parameter reading module 250.

The de-mapping related parameter generation module 210 is configured to generate a de-mapping related parameter of each CORESET and a first start parameter of each search space, wherein the first start parameter includes a CORESET associated with the search space.

The second start parameter generation module 220 is configured to generate a second start parameter of each CORESET according to the first start parameter, wherein the second start parameter includes one or more second start occasions and one or more search spaces associated with the one or more second start occasions.

The blind detection parameter calculation module 230 is configured to traverse each second start occasion according to the second start parameter, calculate index information of a blind detection parameter and the de-mapping related parameter, and store the index information of the blind detection parameter and the de-mapping related parameter into the search space associated with the traversed second start occasion.

The activation flag updating module 240 is configured to sequentially traverse each search space according to a set priority, determine whether the traversed search space is activated, and in a case where the traversed search space is activated, update a state of an activation flag in the second start occasion, associated with the search space, of the CORESET to an activated state.

The parameter reading module 250 is configured to sequentially traverse each second start occasion in the second start parameter of each CORESET according to a time sequence, and in a case where the state of the activation flag in the traversed second start occasion is the activated state, read the de-mapping related parameter and the blind detection parameter corresponding to the second start occasion.

In an exemplary implementation, the first start parameter further includes the number of one or more first start occasions and a starting symbol of each first start occasion. The CORESET associated with the search space includes a CORESET respectively associated with each of the one or more first start occasions. The de-mapping related parameter generation module 210, when being configured to generate the first start parameter of each search space, is configured to:

sequence, for each search space, each first start occasion according to the starting symbol of each first start occasion to obtain the first start parameter of each search space.

In an exemplary implementation, the second start parameter generation module 220 is further configured to:

sequence first start occasions in respective search spaces according to the starting symbol and/or a continuous symbol length of each first start occasion, and merge first start occasions with the same starting symbol and associated with the same CORESET to obtain the one or more second start occasions of each CORESET; and determine the search space associated with each second start occasion according to the first start occasions in respective search spaces to obtain the second start parameter of each CORESET.

In an exemplary implementation, a position of each first start occasion in the CORESET is determined according to the search space associated with each second start occasion, and the position of each first start occasion in the CORESET is added to the first start parameter.

In an exemplary implementation, the blind detection parameter includes a CCE start position, a scrambling mode, a load, and an aggregation level.

In an exemplary implementation, the set priority satisfies a condition that a priority of a common search space is higher than that of a user search space.

In an exemplary implementation, the de-mapping related parameter includes a de-mapping configuration parameter, a mapping relationship from an REGB to a PRB, and a mapping relationship from a CCE to an REGB.

Figure 9:
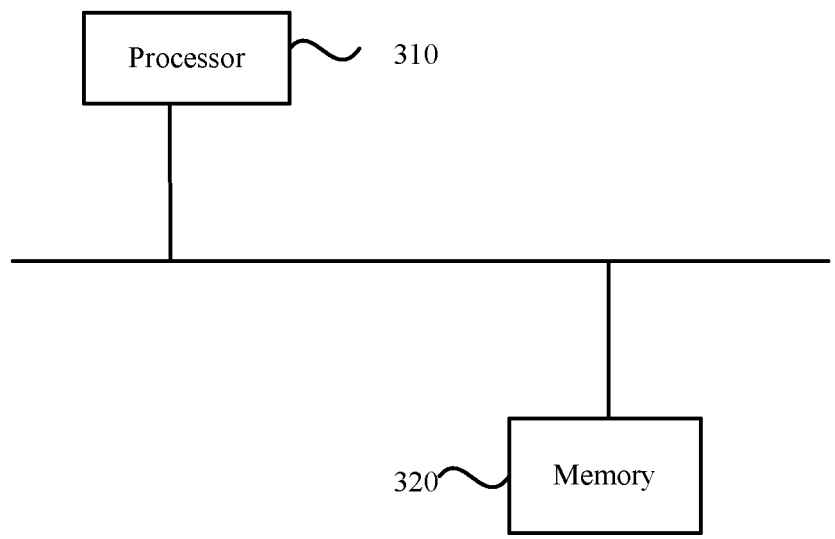
FIG. 9 is a structure diagram of a computer device according to an embodiment of the present disclosure.

In an embodiment, FIG. 9 is a structure diagram of a computer device according to an embodiment of the present disclosure. As shown in FIG. 9, the device provided in the embodiment of the present disclosure includes a processor 310 and a memory 320. There may be one or more processors 310 in the device. FIG. 9 shows the structure including one processor 310 as an example. There may be one or more memories 320 in the device. FIG. 9 shows the structure including one memory 320 as an example. The processor 310 and memory 320 of the device may be connected by a bus or other manners. FIG. 9 shows the structure implementing the connection by a bus as an example. In the embodiment, the device is a computer device.

As a computer-readable storage medium, the memory 320 is configured to store a software program, a computer-executable program, and a module, such as a program instruction/module (e.g., a coding module and first sending module in a data transmission apparatus) corresponding to the device in any embodiment of the present disclosure. The memory 320 may include a program storage region and a data storage region. The program storage region may store an operating system and an application program needed by at least one function. The data storage region may store data created according to the use of the device, etc. In addition, the memory 320 may include a high-speed Random Access Memory (RAM), or a nonvolatile memory, such as at least one disk storage device, flash memory device or other nonvolatile solid-state storage device. In some examples, the memory 320 may further include a memory arranged remotely relative to the processor 310, and the remote memory may be connected to the device through a network. Examples of the network include, but not limited to, the Internet, an intranet of an enterprise, a local area network, a mobile communication network, and a combination thereof.

The device provided above is configured to execute the channel information processing method provided in any one of the above-mentioned embodiments, and has corresponding functions and effects.

Correspondingly, the program stored in the memory 320 may be a program instruction/module corresponding to the channel information processing method provided in the embodiment of the present disclosure. The processor 310 runs the software program, instruction, and module stored in the memory 320, thereby executing one or more types of function applications and data processing of the computer device, namely implementing the channel information processing method in the method embodiment. It can be understood that the device, when being a receiver, may execute the channel information processing method provided in any embodiment of the present disclosure, and has corresponding functions and effects.

An embodiment of the present disclosure also provides a storage medium including a computer-executable instruction. The computer-executable instruction, when being executed by a processor of a computer, is used for executing a channel information processing method, including: generating a de-mapping related parameter of each CORESET and a first start parameter of each search space, wherein the first start parameter includes a CORESET associated with the search space; generating a second start parameter of each CORESET according to the first start parameter, wherein the second start parameter includes one or more second start occasions and one or more search spaces associated with the one or more second start occasions; traversing each second start occasion according to the second start parameter, calculating index information of a blind detection parameter and the de-mapping related parameter, and storing the index information of the blind detection parameter and the de-mapping related parameter into a search space associated with the traversed second start occasion; traversing each search space, determining whether the traversed search space is activated, and in a case where the traversed search space is activated, updating a state of an activation flag in the second start occasion of the CORESET associated with the present search space to an activated state; and sequentially traversing each second start occasion in the second start parameter of each CORESET according to a time sequence, and in a case where the state of the activation flag in the traversed second start occasion is the activated state, reading the de-mapping related parameter and the blind detection parameter corresponding to the present second start occasion.

Those having ordinary skill in the art should know that term user equipment covers wireless user equipment of any proper type, such as a mobile phone, a portable data processing apparatus, a portable web browser, or a vehicle-mounted mobile station.

Generally, various embodiments of the present disclosure may be implemented in hardware or dedicated circuits, software, logics, or any combination thereof. For example, some aspects may be implemented in hardware, while the other aspects may be implemented in firmware or software executable for a controller, a microprocessor, or another computing device. However, the present disclosure is not limited thereto.

The embodiment of the present disclosure may be implemented by a data processor of a mobile device by executing a computer program instruction, such as by hardware or a combination of software and hardware in a processor entity. The computer program instruction may be an assembly instruction, an Instruction Set Architecture (ISA) instruction, a machine instruction, a machine related instruction, a microcode, a firmware instruction, a state setting data, or a source code or target code written by any combination of one or more programming languages.

The block diagram of any logic flow in the drawings of the present disclosure may represent procedure operations, or mutually connected logic circuits, modules, and functions, or a combination of procedure operations and logic circuits, modules, and functions. The computer program may be stored in a memory. The memory may be implemented into any type suitable for the local technical environment by use of any proper data storage technology, such as, but not limited to, a Read-Only Memory (ROM), a RAM, and an optical memory device and system (Digital Video Disc (DVD) or Compact Disk (CD)). The computer-readable medium may include a non-transitory storage medium. The data processor may be of any type suitable for the local technical environment, such as, but not limited to, a general-purpose computer, a single-purpose computer, a microprocessor, a Digital Signal Processor (DSP), an Application Specific Integrated Circuit (ASIC), a Field-Programmable Gate Array (FPGA), and a multi-core processor architecture-based processor.

The above are only the exemplary embodiments of the present disclosure and not intended to limit the scope of protection of the present disclosure.

The embodiments of the present disclosure may be implemented by a data processor of a mobile device by executing a computer program instruction, such as by hardware or a combination of software and hardware in a processor entity. The computer program instruction may be an assembly instruction, an ISA instruction, a machine instruction, a machine related instruction, a microcode, a firmware instruction, a state setting data, or a source code or target code written by any combination of one or more programming languages.

Detailed descriptions about exemplary embodiments of the present disclosure have been made above through exemplary and nonrestrictive examples. However, in combination with the drawings and the claims, various modifications and regulations of the above embodiments are apparent to those having ordinary skill in the art, but do not depart from the scope of the present disclosure. Therefore, the scope of the present disclosure is determined according to the claims.

What is claimed is:

1. A channel information processing method, comprising:
   generating a de-mapping related parameter of each Control Resource Set (CORESET) and a first start parameter of each search space, wherein the first start parameter comprises a CORESET associated with the search space;
   generating a second start parameter of each CORESET according to the first start parameter, wherein the second start parameter comprises one or more second start occasions and one or more search spaces associated with the one or more second start occasions;
   traversing each second start occasion according to the second start parameter, calculating index information of a blind detection parameter and the de-mapping related parameter, and storing the index information of the blind detection parameter and the de-mapping related parameter into the search space associated with the traversed second start occasion;

traversing each search space, determining whether the traversed search space is activated, and in a case where the traversed search space is activated, updating a state of an activation flag in the second start occasion, associated with the search space, of the CORESET to an activated state; and sequentially traversing each second start occasion in the second start parameter of each CORESET according to a time sequence, and in a case where the state of the activation flag in the traversed second start occasion is the activated state, reading the de-mapping related parameter and the blind detection parameter corresponding to the second start occasion.

2. The method according to claim 1, wherein the first start parameter further comprises the number of one or more first start occasions and a starting symbol of each first start occasion; the CORESET associated with the search space comprises a CORESET respectively associated with each of the one or more first start occasions; and generating the first start parameter of each search space comprises:

sequencing, for each search space, each first start occasion according to the starting symbol of each first start occasion to obtain the first start parameter of each search space.

3. The method according to claim 2, wherein generating the second start parameter of each CORESET according to the first start parameter comprises:

sequencing first start occasions in respective search spaces according to the starting symbol and/or a continuous symbol length of each first start occasion, and merging first start occasions with the same starting symbol and associated with the same CORESET to obtain the one or more second start occasions of each CORESET; and determining the search space associated with each second start occasion according to the first start occasions in respective search spaces to obtain the second start parameter of each CORESET.

4. The method according to claim 3, wherein a position of each first start occasion in the CORESET is determined according to the search space associated with each second start occasion, and the position of each first start occasion in the CORESET is added to the first start parameter.

5. The method according to claim 1, wherein the blind detection parameter comprises a Control Channel Element (CCE) start position, a scrambling mode, a load, and an aggregation level.

6. The method according to claim 1, wherein traversing each search space comprises:

sequentially traversing each search space according to a set priority, wherein the set priority satisfies a condition that a priority of a common search space is higher than that of a user search space.

7. The method according to claim 1, wherein the de-mapping related parameter comprises a de-mapping configuration parameter, a mapping relationship from a Resource Element Group Buddle (REGB) to a Physical Resource Block (PRB), and a mapping relationship from a CCE to an REGB.

8. A channel information processing apparatus, comprising a memory storing instructions and a processor in communication with the memory, wherein the processor is configured to execute the instructions to:

generate a de-mapping related parameter of each Control Resource Set (CORESET) and a first start parameter of each search space, wherein the first start parameter comprises a CORESET associated with the search space;

generate a second start parameter of each CORESET according to the first start parameter, wherein the second start parameter comprises one or more second start occasions and one or more search spaces associated with the one or more second start occasions;

traverse each second start occasion according to the second start parameter, calculate index information of a blind detection parameter and the de-mapping related parameter, and store the index information of the blind detection parameter and the de-mapping related parameter into the search space associated with the traversed second start occasion;

traverse each search space, determine whether the traversed search space is activated, and in a case where the traversed search space is activated, update a state of an activation flag in the second start occasion, associated with the search space, of the CORESET to an activated state; and sequentially traverse each second start occasion in the second start parameter of each CORESET according to a time sequence, and in a case where the state of the activation flag in the traversed second start occasion is the activated state, read the de-mapping related parameter and the blind detection parameter corresponding to the second start occasion.

9. A computer device, comprising a memory, a processor, and a computer program stored in the memory and capable of running in the processor, wherein the processor executes the program to implement the channel information processing method according to claim 1.

10. A non-transitory computer-readable storage medium, storing a computer program, wherein the program is executed by a processor to implement the channel information processing method according to claim 1.

11. The method according to claim 1, wherein in the first start parameter, the CORESET associated with the search space is represented by an Identity (ID) of the CORESET.

12. The method according to claim 7, wherein the mapping relationship from the REGB to the PRB and the mapping relationship from the CCE to the REGB are represented in a bitmap form.

13. The apparatus according to claim 8, wherein the first start parameter further comprises the number of one or more first start occasions and a starting symbol of each first start occasion; the CORESET associated with the search space comprises a CORESET respectively associated with each of the one or more first start occasions; and the processor, when being configured to generate the first start parameter of each search space, is configured to execute the instructions to:

sequence, for each search space, each first start occasion according to the starting symbol of each first start occasion to obtain the first start parameter of each search space.

14. The apparatus according to claim 13, wherein the processor, when being configured to generate the second start parameter of each CORESET according to the first start parameter, is configured to execute the instructions to:

sequence first start occasions in respective search spaces according to the starting symbol and/or a continuous symbol length of each first start occasion, and merge first start occasions with the same starting symbol and associated with the same CORESET to obtain the one or more second start occasions of each CORESET; and determine the search space associated with each second start occasion according to the first start occasions in respective search spaces to obtain the second start parameter of each CORESET.

15. The apparatus according to claim 14, wherein a position of each first start occasion in the CORESET is determined according to the search space associated with each second start occasion, and the position of each first start occasion in the CORESET is added to the first start parameter.

16. The apparatus according to claim 8, wherein the blind detection parameter comprises a Control Channel Element (CCE) start position, a scrambling mode, a load, and an aggregation level.

17. The apparatus according to claim 8, wherein the processor, when being configured to traverse each search space, is configured to execute the instructions to: sequentially traverse each search space according to a set priority, wherein the set priority satisfies a condition that a priority of a common search space is higher than that of a user search space.

18. The apparatus according to claim 8, wherein the de-mapping related parameter comprises a de-mapping configuration parameter, a mapping relationship from a Resource Element Group Buddle (REGB) to a Physical Resource Block (PRB), and a mapping relationship from a CCE to an REGB.

19. The apparatus according to claim 8, wherein in the first start parameter, the CORESET associated with the search space is represented by an Identity (ID) of the CORESET.

20. The apparatus according to claim 18, wherein the mapping relationship from the REGB to the PRB and the mapping relationship from the CCE to the REGB are represented in a bitmap form.

* * * * *